United States Patent [19]
Paley et al.

[11] Patent Number: 5,205,326
[45] Date of Patent: Apr. 27, 1993

[54] PRESSURE RESPONSE TYPE PULSATION DAMPER NOISE ATTENUATOR AND ACCUMULATOR

[75] Inventors: Edward D. Paley, Grosse Point; Gregory E. Leemhuis, Auburn Hills; Kerry A. Machesney, Farmington Hills, all of Mich.

[73] Assignee: Hydraulic Power Systems, Inc., Oak Park, Mich.

[21] Appl. No.: 749,127

[22] Filed: Aug. 23, 1991

[51] Int. Cl.$^5$ ............................................. F16L 55/04
[52] U.S. Cl. ...................... 138/30; 138/31; 417/540
[58] Field of Search .............. 138/26, 30, 31; 417/540; 220/85 B

[56] References Cited

U.S. PATENT DOCUMENTS

| | | | |
|---|---|---|---|
| Re. 31,480 | 1/1984 | Major | 137/544 |
| 2,049,487 | 8/1936 | Beeh | 137/145 |
| 2,411,315 | 11/1946 | Ashton | 138/31 |
| 2,682,893 | 7/1954 | Ziebold | 138/30 |
| 2,695,037 | 11/1954 | McCuistion | 138/31 |
| 2,916,052 | 12/1959 | Peters | 138/30 |
| 3,088,493 | 5/1963 | Baines et al. | 138/31 |
| 3,159,182 | 12/1964 | Peters | 138/30 |
| 3,162,213 | 12/1964 | Peters | 138/30 |
| 3,273,577 | 9/1966 | Moore | 137/13 |
| 3,422,853 | 1/1969 | Schmid | 138/30 |
| 3,537,357 | 11/1970 | Packer | 138/31 |
| 3,633,627 | 1/1972 | Perrott | 138/31 |
| 3,695,297 | 10/1972 | Ferrentino | 138/30 |
| 3,804,125 | 4/1974 | Sonneman | 138/30 |
| 3,853,147 | 12/1974 | Cibulka | 138/30 |
| 3,862,646 | 1/1975 | Tarsha | 138/30 |
| 4,256,145 | 3/1981 | Phillips | 138/31 |
| 4,685,491 | 8/1987 | Fulmer et al. | 138/30 |
| 4,997,009 | 3/1991 | Niikura et al. | 138/31 |

FOREIGN PATENT DOCUMENTS 1512000 5/1978 United Kingdom .................. 138/30

Primary Examiner—James E. Bryant, III
Attorney, Agent, or Firm—Basile and Hanlon

[57] ABSTRACT

A pulsation damper and noise attenuator assembly comprising a housing having an inlet port and an outlet port fluidly connecting the interior of the housing to the flow path of the fluid flow system. A base is mounted to the housing and comprises a vent fluidly connecting the interior of the housing to an external fluid source. A sealing member such as an expandable bellows or piston is seated within the housing and creates a fluid tight seal between the fluid flow path and the external fluid source sealing member. The external fluid biases the sealing member in a forward direction. The sealing member acting against the $N_2$ fluid under pressure absorbs the full force of the hydraulic shock waves or pulsation within a high pressure fluid flow system as the assembly is mounted directly within the flow path of the fluid. The shock wave is exposed across the full face of the sealing member and dampened prior to the fluid continuing along the flow path.

6 Claims, 2 Drawing Sheets

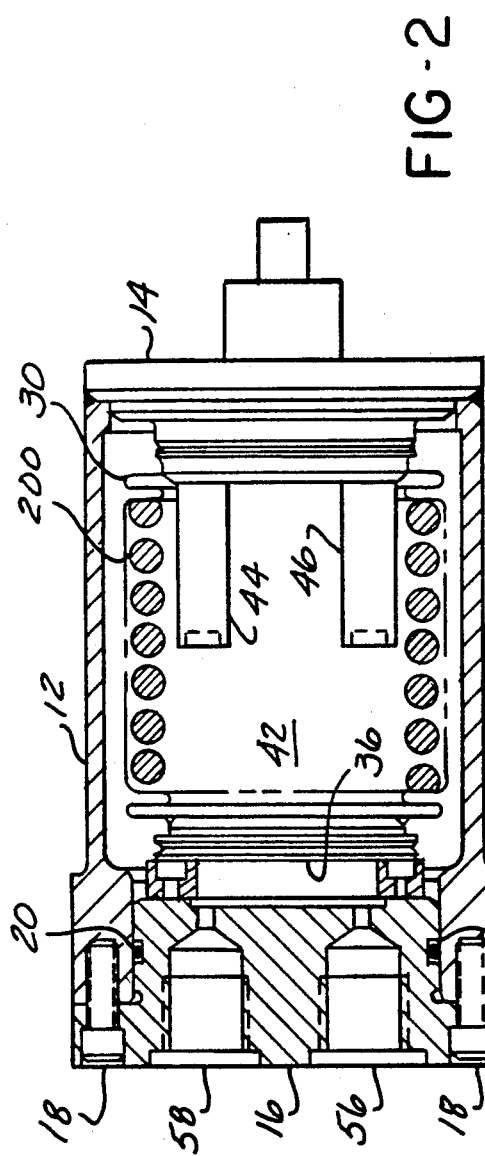
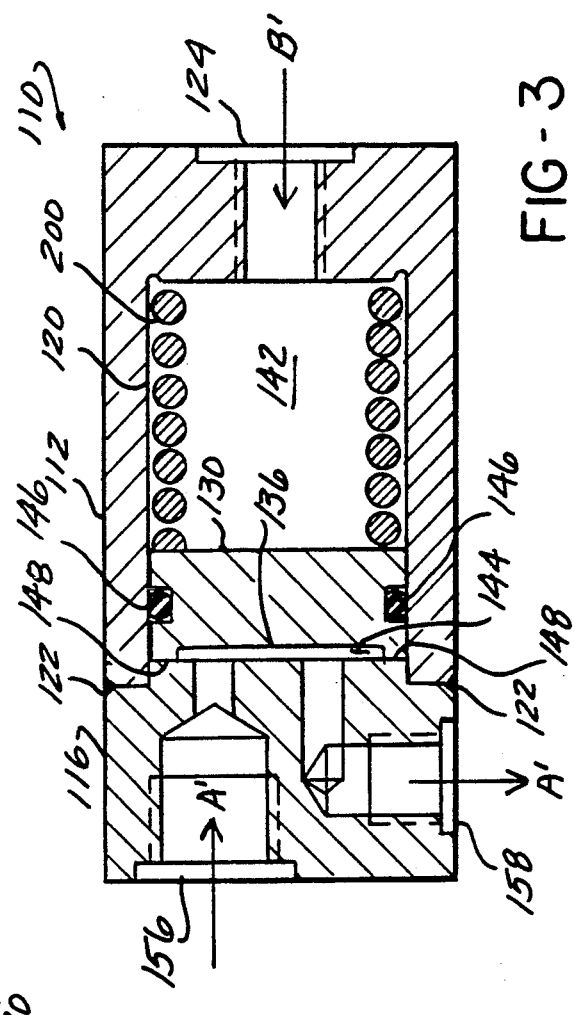

PRESSURE RESPONSE TYPE PULSATION DAMPER NOISE ATTENUATOR AND ACCUMULATOR

BACKGROUND OF THE INVENTION

I. Field of the Invention

The present invention relates to a pulsation damper and noise attenuator assembly for use in a fluid flow system. More particularly, the present invention relates to a pulsation damper and noise attenuator assembly that is mounted directly in the fluid flow path of the fluid flow system.

II. Description of the Prior Art

A pulsation damper and noise attenuator assembly is generally used in a fluid flow system to dampen or prevent development of pressure pulsation in a system where it is desired to continuously deliver fluids under pressure. Fluid pressure pumps, and, in particular positive displacement pumps create pressure pulsations during normal operation which can cause excessive strain and/or damage to the conduits and within the fluid system. Further, the airborne sound generated by the pulsation traveling through the conduit may be very loud and poses an annoyance or possible hazzard to the user of the equipment.

To overcome these phenomenons, several prior art fluid devices have been developed. A disadvantage of these previously known control device is that the apparatus is not placed directly in the flow path of fluid but is instead usually coupled to the end of a T shaped connection. Removing the prior art device from the fluid flow path prevents the device from absorbing the full force of the pulsation as the wave is not forced to flow directly through the device. Therefore, any pulsation that interrupts the fluid flow may not be suppressed by the device due to its indirect application in the flow path.

A still further disadvantage of the prior art devices is that the fluid flow is not exposed to the complete surface area of the dampening device. That is, the path of the pulsation is not directed across the full face of the piston used to absorb the pulsation. Therefore, complete absorption or dampening of the pulsation is not provided by the prior art devices and, as such, the pulsation is allowed to dissipate throughout the entire fluid flow path.

SUMMARY OF THE PRESENT INVENTION

The present invention provides a pulsation damper and noise attenuator assembly which overcomes the disadvantages of the previously known fluid control apparatuses.

The pulsation damper and noise attenuator assembly of the present invention comprises a housing having an inlet port fluidly connecting a first interior chamber of the housing to an external fluid pressure source such as pressurized nitrogen. The housing, further comprises an inlet port and an outlet port which fluidly connect a second interior chamber of the housing to the flow path of a fluid flow system such as, respectively, a fluid pump and a motor connect in an open and/or closed loop system.

A sealing member, such as a free floating piston in a first embodiment or an expandable bellows in a second embodiment, or other sealing members such as a diaphragm, is seated within the interior of the housing (of suitable shape, e.g. cylindrical, round, spherical, etc.) and separates the housing interior into the first and second chambers.

In use the assembly inlet is in communication with a source of fluid under pressure and all flow in the system passes through the second aforementioned chamber. Therefore, any hydraulic shock wave or pulsation is directed into the assembly to allow the sealing member to absorb the pulsation. The sealing member counterbalances the high pressure fluid by the external fluid, preferably an inert gas such as nitrogen, which is communicated under pressure to the first pressurized housing chamber.

Unlike the previously known fluid control apparatuses, the present invention provides that the force of a hydraulic shock waves or pulsations within the fluid flow system is directed across the entire forward face of the sealing member. By exposing the pulsations to a larger area, this insures that the pulsations will be absorbed by the assembly and dissipates the same with minimal affect on the high pressure fluid flow within the system. Further, by placing the assembly directly in the flow path of the fluid flow system the shock waves or pulsations is forced to be directed within the assembly and absorbed thereby.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 2 is a side cross-sectional view of the preferred embodiment of FIG. 1 illustrating the sealing member in its fully expanded position; and FIG. 3 is a side cross-sectional view illustrating a second preferred embodiment of the present invention.

DETAILED DESCRIPTION OF THE PREFERRED EMBODIMENTS

Figure 1:
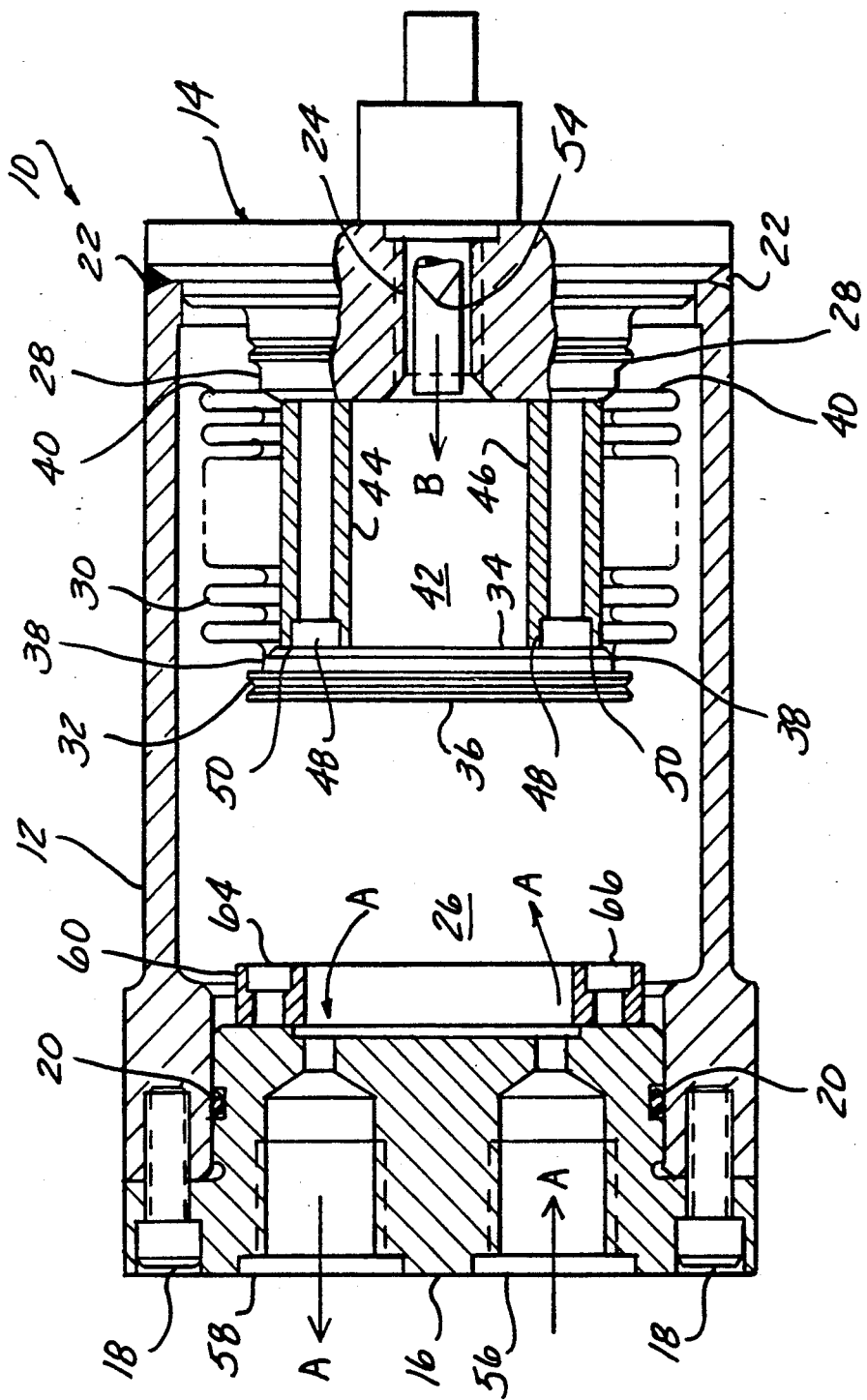
FIG. 1 is a cross-sectional side view illustrating a first preferred embodiment of the present invention with the sealing member in its fully contracted position.

Referring to FIG. 1 wherein there is illustrated a first preferred embodiment of the present invention in the form of a pulsation damper and noise attenuator assembly 10 which comprises a housing 12 formed of an elongate hollow cylinder and sealed at one end by a valve assembly 14. A base assembly 16 is mounted to the opposite end of the housing 12 by suitable mounting means such as screws (or welded) 18. A seal such as an elastimer seal or metalic ring 20 about the perimeter of the base assembly 16 creates a fluid tight seal between the housing 12 and the base assembly 16. Valve assembly 14 is preferably mounted to the housing 12 by welding (or screw-in) as shown at 22 and completely seals the interior of the housing 12.

The valve assembly 14 includes a passageway 24 for fluidly connecting an inner chamber 42 of a sealing member to an external pressure fluid source such as an inert gas, preferably nitrogen. In this preferred embodiment, the sealing member is preferably a bellows 30 that is expandable and retractable in reaction to fluid pressure acting thereon. The bellows 30 is sealed at one end 32 to a member 36 having pressure response surface 34 and is movable therewith to expand and contract. The opposite end 40 of the bellows 30 is mounted to support 28 of the valve assembly 14 to create a fluid tight assembly between the valve assembly 14 and the bellows 30 to define the fluid tight inner chamber 42. The fluid tight seal of the bellows 30 about the support 28 prevents the nitrogen from seeping into the interior chamber 26 of the housing 12.

Stops such as cylinders 44, 46 are mounted by bolts 48 to the support 28 within the interior chamber 42 of the bellows 30. Cylinders 44, 46 prevent the bellows 30 from retracting within the interior 26 of the housing 12 beyond the faces 50 of the cylinders 44, 46. A check valve 54 is provided within the passageway 24 to permit the entry of $N_2$ into the chamber 42 and prevent backflow of nitrogen from the chamber 42.

Base assembly 16 comprises an inlet port 56 and an outlet port 58 fluidly connecting the interior chamber 26 of the housing 12 with the flow path of the fluid flow system. Preferably the inlet port is connected in close proximity to the outlet of the source of the pressure pulsation, such as a piston pump. Mounting members such as ring 60 is fixedly mounted to the base assembly 16 by bolts 64 (or other permanent mounts such as welds or stops) within the interior 26 of the housing 12 to limit the bellows 3 movement toward the inlet and outlet ports (see FIG. 2).

Flow path A exemplifies the flow path of the fluid flowing within the system.

In use, the pulsation damper and noise attenuator assembly 10 is advantageously placed directly within the flow path of the fluid flow assembly such as between a fluid pump and fluid motor. In this way, any hydraulic shock waves or pulsations that develop in the high pressure system are directed into the assembly 10 to be dissipated by the retracting bellows 30. Further, the pulsation is exposed to the full pressure responsive surface 34 of member 36 to be absorbed by the bellows 30 acting against the $N_2$ filled chamber under pressure to provide a gas spring pulsation absorber. A larger area of deflection is afforded by this system.

Nitrogen from an external fluid source fills the inner chamber 42 of the bellows 30 to a predetermined pressure (e.g. 2000 psi). In its steady state, bellows 30 is expanded to an intermediate position between the ring 60 and the cylinders 44 and 46.

Pulsation within the fluid flow path flow along flow path A through inlet port 56 of the assembly 10. The pulsation is absorbed by the bellows 30 acting against the $N_2$ chamber 42 and forces it to contract. The balancing force of the nitrogen within the bellows counters and reduces and/or eliminates pulsation. The pulsations are absorbed by the nitrogent spring within the bellows 36. The charge of $N_2$ is prepressured to be between 50% and 70% of the pressure of the fluid system.

With reference now to FIG. 3, a second preferred pulsation damper and noise attenuator assembly 110 is illustrated. In this embodiment, a housing 112 comprises an inlet port 124 fluidly connecting an interior chamber 142 of the housing 112 to an external fluid source, preferably an inert gas such as nitrogen so as to pressurize the chamber 142 to a predetermined amount, say 1500 psi.

A base assembly 116 is mounted to the housing 112 preferably by welding means as shown at 122 (threaded or bolts or snap rings or other suitable retention means may be used) to create a fluid type seal between the housing 112 and the base assembly 116.

Base assembly 116 comprises an inlet port 156 and an outlet port 158 fluidly connecting the interior of the housing 112 to the flow path of a fluid flow system.

A sealing member in the form of a free floating piston 130 is freely slidable within the interior of the housing 112 and defines a movable wall of the inner chamber 142 that is exposed to the pressurized nitrogen and an outer chamber 144 exposed to the fluid within the flow path of the assembly 110. Piston 130 comprises a seal such as an elastimer seal or a metalic ring 146 creating a fluid tight seal that prevents the nitrogen from mixing with the fluid in the chamber 144. Piston 130 also comprises restraining means in the form of a ring shaped shoulder 148 extending around the perimeter of the piston 130. Restraining means 148 prevents the front face 136 of the piston 130 from seating directly on the inlet and outlet ports 156 and 158.

In use, the assembly 110 is advantageously placed directly within the flow path of the fluid thereby directing the full force of the pulsation into the assembly 110. Flow path A' is the direction of the fluid within the flow path of the system such as from a piston pump to a fluid motor. Flow path B' shows the flow path of the nitrogen as it is initially directed into the interior of the housing 112 to pressurize the chamber 142. In use, inner chamber 142 is filled with nitrogen via the external fluid source through the inlet port 124. The free floating piston 130 is stabilized within the system and seated as shown in FIG. 3. Fluid flows through the inlet port 156 and is exposed to the entire outer face 136 of the piston 130. The nitrogen counterbalances the force of the high pressure fluid against the entire face of the piston 136, forcing the piston 136 to stabilize at some intermediate position while fluid flows through to the outlet port 158 into the fluid flow path. When a pulsation is developed within the system, the pulsation is directed across the full outer face 136 of the piston 130. The excessive pressure forces the piston 130 rearward toward the inlet port 124 and, in turn, is forced into a forward position by the nitrogen counteracting the pulsation along the inner face 134 of the piston 130. Because the piston 130 free floats within the interior of the housing 112 the excessive force created by the pulsation is dampened by the action of the piston acting against the $N_2$ chamber 142 within the housing 112.

The spring rate may be further controlled by the use of a spring used inside the chamber 42 and/or 142 as shown by the numeral 200 in FIGS. 2 and 3.

Having described our invention, however, many modifications thereto will become apparent to those skilled in the art to which it pertains without deviation from the spirit of the invention as defined by the scope of the appended claims.

What is claimed is:

1. A pulsation damper and noise attenuator assembly for use in a liquid flow path of a fluid flow system comprising:
    an elongated housing having a longitudinal axis with first and second ends;
    a base mounted to said housing at one end defining an internal chamber in cooperation with said housing;
    a rigid movable member having a forward face extending substantially across an entire cross sectional area of said housing, said moveable member disposed within said internal chamber of said housing for longitudinal reciprocation, said moveable member separating said internal chamber of said housing into an expandable first chamber and an expandable second chamber;

a fluid tight seal member for connecting said moveable member to said housing;

a first inlet port formed in said housing fluidly connecting said first chamber of said housing to an external pressurized gas source, such that said moveable member is normally disposed, during a stable steady liquid flow, in an intermediate position between said first and second ends of said housing;

a second inlet port and an outlet port formed in said base, said second inlet port having a central axis parallel with said longitudinal axis of said housing, said second inlet port and said outlet port fluidly connecting the second chamber of said housing to the liquid flow path of said fluid flow system, such that said liquid flow path directly impacts said entire forward face of said moveable member;

at least one stop connected to the housing for restraining movement of said moveable member, such that said first chamber is prevented from fully contracting within said housing;

at least one ring shaped should connected to one of the moveable member and the base for restraining movement of said moveable member, such that said first chamber is prevented from fully expanding within said housing; and a check valve connected to the first inlet port for allowing gas flow from said external pressurized gas source into said first chamber and preventing back-flow of gas out of said first chamber;

wherein said assembly is mounted directly in the liquid flow path of said fluid flow system and said liquid flow path is directed across the entire forward face of said moveable member.

2. The pulsation damper and noise attenuator assembly of claim 1 wherein said sealing member is a bellows.

3. The pulsation damper and noise attenuator assembly of claim 1 wherein said moveable member is a piston.

4. The pulsation damper and noise attenuator assembly of claim 3 wherein said sealing member is an annular seal ring disposed on said piston.

5. The pulsation damper and noise attenuator assembly of claim 1 further comprising a spring fir biasing said moveable member toward said base.

6. The pulsation damper and noise attenuator assembly of claim 5 wherein said spring is disposed in the first chamber.

* * * * *

UNITED STATES PATENT AND TRADEMARK OFFICE
CERTIFICATE OF CORRECTION

PATENT NO. :   5,205,326
DATED      :   April 27, 1993
INVENTOR(S) :  Edward D. Paley et al.

It is certified that error appears in the above-identified patent and that said Letters Patent is hereby corrected as shown below:

Column 3, line 28, please delete "3" and insert --30--.

Column 5, line 25, please delete "should" and insert --shoulder--.

Column 6, line 21, please delete "fir" and insert --for--.

Signed and Sealed this

Fifteenth Day of March, 1994

Attest:

BRUCE LEHMAN

*Attesting Officer*    Commissioner of Patents and Trademarks